INVENTORS.
CHARLES A. BEAMAN
RAYMOND L. KRALEY
ATTORNEY

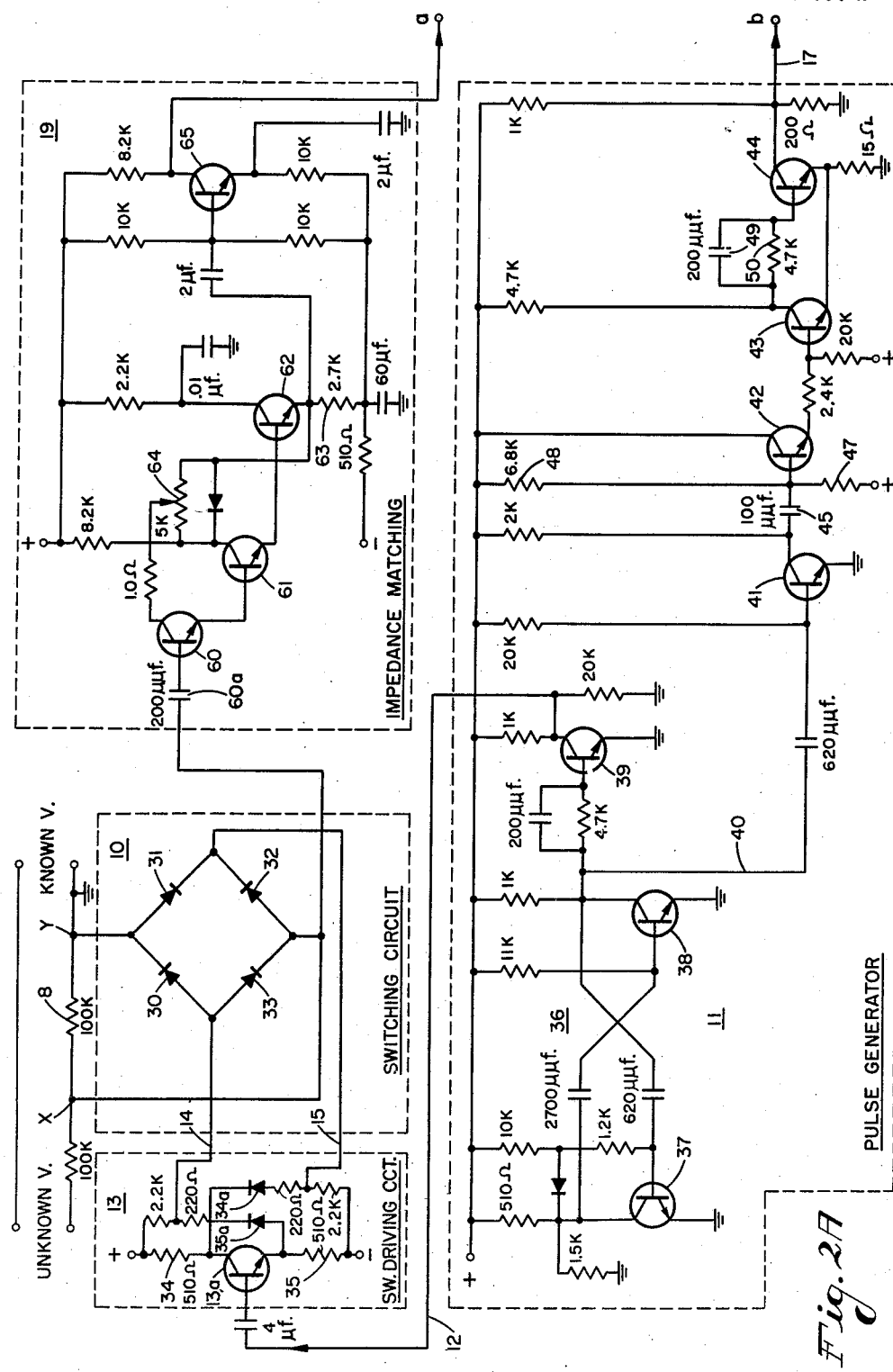

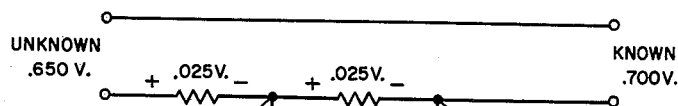
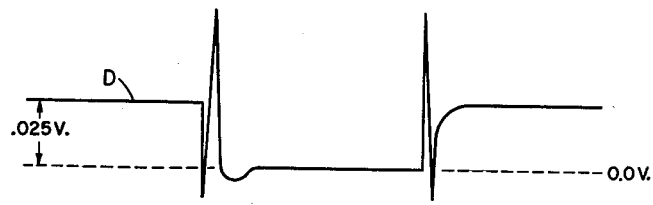
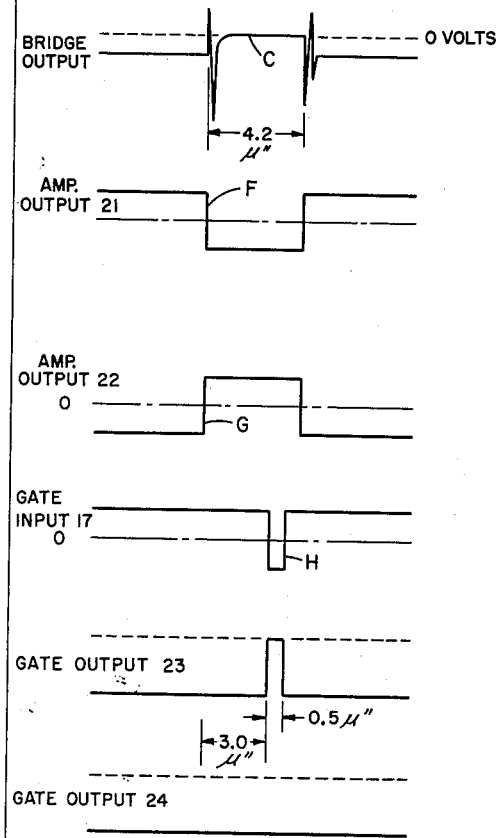
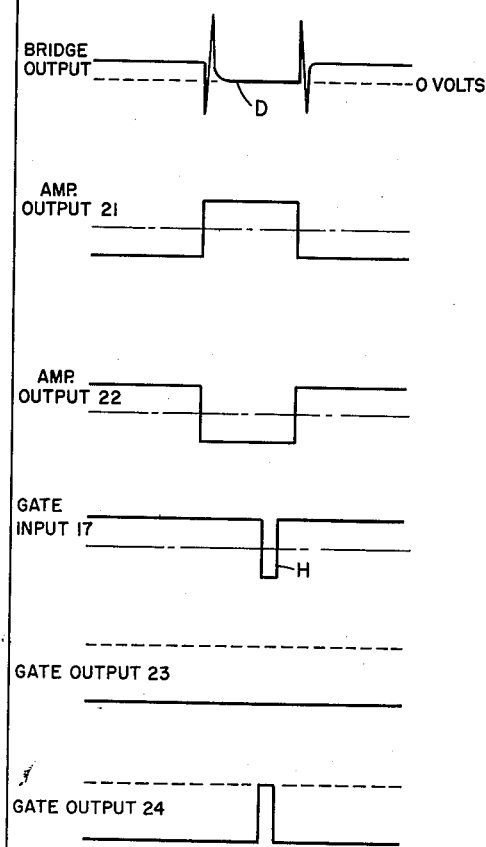

United States Patent Office 3,120,663
Patented Feb. 4, 1964

3,120,663
VOLTAGE COMPARATOR SYSTEM
Charles A. Beaman and Raymond L. Kraley, Rochester, N.Y., assignors to General Dynamics Corporation, Rochester, N.Y., a corporation of Delaware
Filed Oct. 13, 1961, Ser. No. 145,019
8 Claims. (Cl. 307—88.5)

This invention relates to systems for measuring voltages and is particularly directed to the type of voltage measuring equipment which compares an unknown voltage with a known voltage and produces a distinct signal change when there is equality of the two voltages.

One limiting factor in the measuring of minute voltages is the input impedance of the measuring equipment. Another limiting factor in the measurement of minute voltages is the difficulty of dependably calibrating the amplifiers which must be used and the gain of which must be very high. Where the voltages to be measured may be commensurate with noise voltages in the system, ordinary direct reading meters become ineffective.

One object of this invention is to provide an improved voltage measuring system in which the effects of amplifier input impedance, amplifier gain, amplifier noise, and amplifier calibration are minimized.

Fortunately, the absolute value of unknown voltages are not always necessary but may be related to or compared with known voltages whereupon the measurement operation consists essentially of determining when the known and unknown voltages are equal.

It is, accordingly, a further feature of this invention to provide an improved voltage measuring system in which known and unknown voltages are compared and the equality of the two voltages are precisely determined and unequivocally indicated.

The objects of this invention are attained by applying like polarities of a known and an unknown voltage to opposite ends of an adding resistor. Then, the polarity of the voltage at one end of the resistor with respect to the voltage at the other end of the resistor determines or is indicative of which voltage is the greater. The polarity reverses when the relative amplitudes of the two voltages change. Switch means are connected between opposite ends of the resistor so that the resistor may be selectively short-circuited. The result is a voltage pulse at one end of the resistor which is either positive-going or negative-going; and when the relative voltage polarities change, the order of the positive- and negative-going pulses reverse. High gain amplifiers of the push-pull differential type are employed to produce a series of strong pulses of one polarity or the other. The polarity of the pulses reverse when the known-unknown voltage ratio reverses to unequivocally indicate when equality of voltages has been arrived at. Transients caused by the switching operation and noise are effectively eliminated by a novel gate circuit so that the sensitivity of the system is not impaired even as the known-unknown voltage ratio approaches zero.

Many other objects and features of this invention will become apparent to those skilled in the art by referring to the preferred embodiments described in the following specification and shown in the accompanying drawings, in which:

FIGS. 2A and 2B are a schematic diagram of the circuits of the system shown in FIG. 1;

FIG. 5 is similar to FIG. 3 and shows a specifically different set of voltage values;

FIG. 6 shows the waveforms of the system resulting from the specific values indicated in FIG. 5;

FIG. 7 is a family of waveforms appearing at selected points in the system of FIGS. 2A and 2B when the known voltage is less than the unknown voltage; and FIG. 8 is a family of waveforms appearing at selected points in FIGS. 2A and 2B when the known voltage is greater than the unknown voltage.

Figure 1:
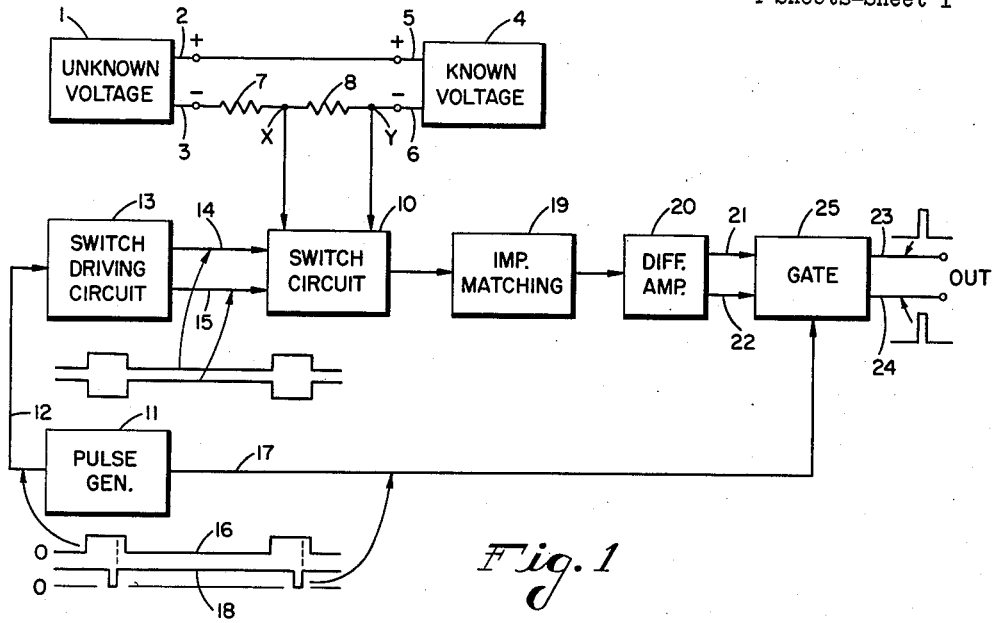
FIG. 1 is a block diagram of a system in accordance with one emodiment of this invention.

In FIG. 1, the unknown voltage source 1 comprises two terminals 2 and 3, one of which is positive with respect to the other but neither of which is necesasrily referred to a reference ground. The unknown voltage source may comprise equipment, the terminal voltage of which must be precisely established at a predetermined value. The known voltage source 4, comprising output terminals 5 and 6, supplies a reference voltage. The reference voltage is preferably adjustable or "programmable" to apply to terminals 5 and 6 precise predetermined voltages. Terminals 3 and 6 of like porality of the two sources are connected at opposite ends of series resistances 7 and 8 which are, preferably though not necessarily, of equal ohmic value. If, now, the known and unknown voltages are equal, no voltage will appear across either resistor 7 or 8. If, however, the unknown voltage is higher than the known voltage, terminal X of resistor 8 will be negative with respect to terminal Y, as suggested by the specific values applied in FIG. 3. If, on the other hand, the unknown voltage is less than the known voltage, terminal X of resistor 8 will be positive with respect to terminal Y.

The manner in which the relative polarities of terminals X and Y are employed to indicate equality of the known and unknown voltages is shown in FIG. 1. Terminals X and Y are either connected directly together or open-circuited by switch circuit 10. Preferably, switch circuit 10 is alternately closed and opened at a regular rate as by the pulse generator 11. For the details of one switch structure and means for driving the switch, reference is made below in FIG. 2A. It is preferred that the output pulses of generator 11 on line 12 be applied first to a phase inverter encompasesd within the switch driving circuit 13 to provide simultaneous complementary positive and negative pulses on lines 14 and 15 of the driving circuit. The pulse repetition frequency of generator 11 may be high or low and preferably the duty cycle is relatively low as indicated by waveform 16 of FIG. 1. According to this invention, the second output line 17 of the pulse generator produces the pulses of waveform 18 of FIG. 1. The pulse repetition frequency of line 17 is the same as on line 12, but the duty cycle is considerably less and the two output pulses are in synchronism. That is, the pulses 18 occur intermediate the ends of pulses 16.

Since very small voltages are switched at terminals X and Y, the output of the switch circuit 10 must work into a high impedance. The necessary high impedance is provided by the input circuit of impedance matching circuit 19, referred to in detail below. Preferably, the output of the impedance matching circuit is low and adapted to drive conventional amplifiers. According to this invention, amplifier 20 is of the push-pull common-emitter differential type with several stages for high gain and with two output leads 21 and 22. On lead 21, the pulse is positive-going or negative-going, depending on whether the switch output pulse is positive-going or negative-going. The polarity of the pulses on lead 22 is always opposite and complementary to the pulses on lead 21. Only that portion of either pulse at line 21 or line 22 is admitted to the output circuits 23 or 24 of gate 25 which is coincident in time with and of the proper polarity with respect to the pulses 18 on line 17 of the pulse generator 11.

In operation, the known and unknown voltages are applied across resistor 8 and the pulse generator 11 is started. A series of either positive or negative pulses appear at the output of the switch circuit depending upon whether the unknown voltage is less than or greater than the known voltage. This condition is indicated by relatively powerful signals on either line 23 or line 24 of the gate. As the unknown voltage is increased or decreased to pass through equality with the known voltage, the polarities of the output pulses on lines 23 or 24 reverse. The operator can then adjust the two voltages to precise equality with the aid of the signals on lines 23 and 24.

Figure 2B:
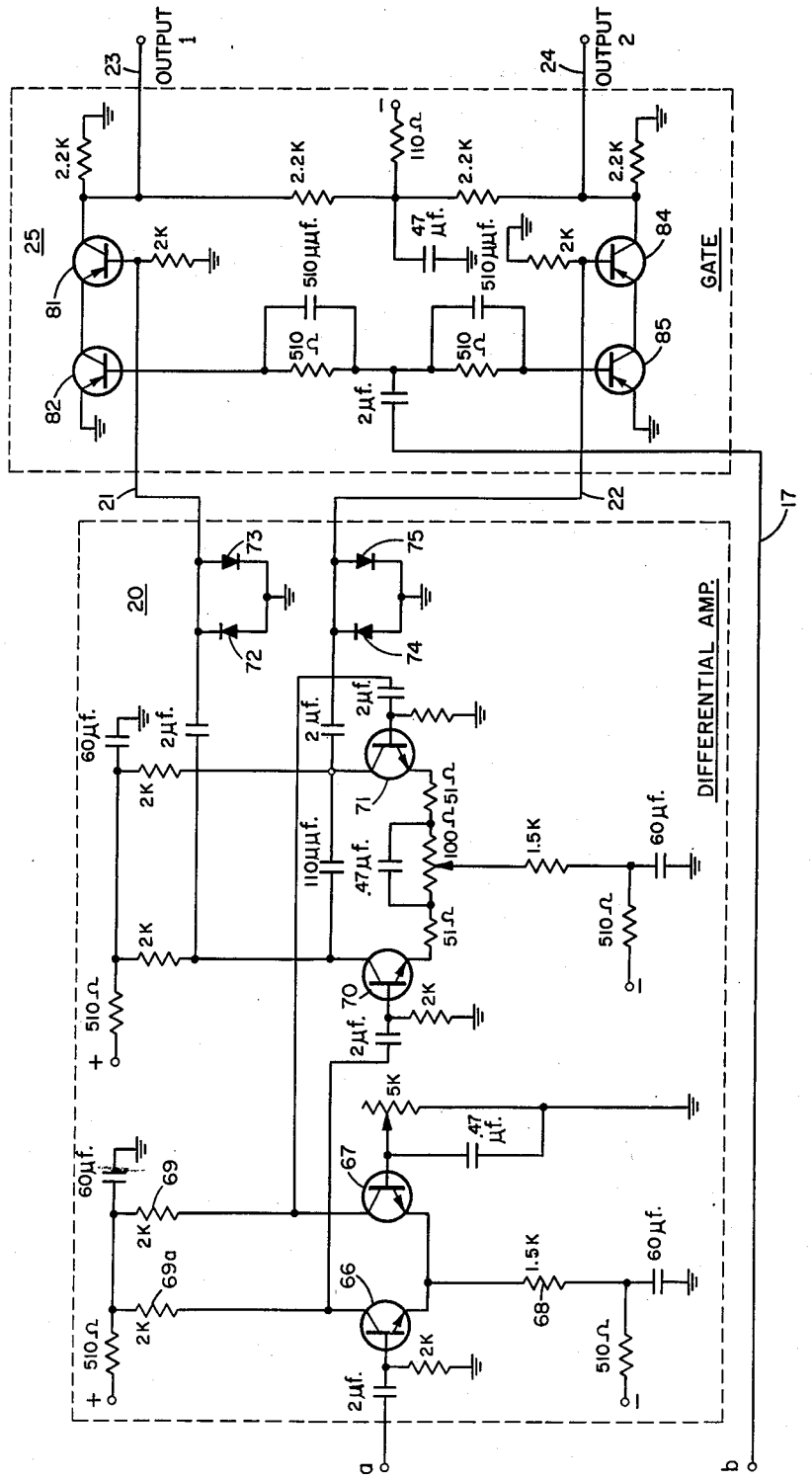

By placing FIGS. 2A and 2B end to end, the circuit diagram of one specific embodiment of the system of FIG. 1 may be viewed. Good results were obtained by employing the specific component values indicated in this diagram. However, it will be apparent that such component values may be varied through wide limits within the realm of good circuit design and within the scope of this invention. The known and unknown voltages are added across resistor 8 as in FIG. 1. Switch circuit 10 for alternately connecting the ends of resistor 8 together comprises a four-sided diode bridge including like diodes 30, 31, 32 and 33 in the four branches. Terminals X and Y of the adding resistor 8 are connected across the vertical diagonal of the bridge. With no bias voltage applied to the diodes, the resistances of the diodes are several megohms so that a virtual open circuit exists between all points of the bridge. This high resistance can be reduced to near zero by applying a biasing voltage which makes the diodes conductive. With respect to the horizontal diagonal of the bridge, the diodes are all similarly polarized so that if line 14 is made positive with respect to line 15 the diodes become conductive and the resistance between all points on the bridge drops to near zero. This means that terminals X and Y, connected across the vertical diagonal, are short-circuited suddenly when the biasing voltage is applied.

The bridge circuit is temperature stable due to the fact that the diodes are all the same and as such should tend to change forward voltage drop by the same amount for each incremental temperature change and compensate for one another. Further, as explained below, the output of the bridge circuit is coupled to its load through a capacitor 60a which means direct current changes in the load caused by temperature changes will not affect the bridge.

Conveniently, the bias driving voltage for the bridge switch is obtained from a phase splitting arrangement comprising the collector and emitter of transistor 13a of the switch driving circuit 13. The voltage of the transistor-ends of resistances 34 and 35 move in opposite directions as the base of the transistor is pulsed positively and conduction starts. These oppositely-moving voltage pulses are applied across opposite ends of the horizontal diagonal of the bridge to bias all diodes of the bridge to conduction. So that the switch driving transistor may be substantially insensitive to temperature changes, the collector and emitter pulse voltages are derived from, respectively, potentiometers including diodes 34a and 35a. The bridge switch interprets temperature impedance changes in the driving circuit as no change. The switch driving circuit 13 receives switching pulses from the output of the free-running multivibrator 36 of generator 11. The base of each of the transistors 37 and 38, of the N-P-N type, is connected, respectively, to the collectors of the opposite transistor. The capacity values and resistance values shown establish the duty cycle, or percentage of "on" time, of the oscillator. If desired, the pulse amplifier 39 may be coupled between the output of the oscillator and the input of the switch driving circuit 13. The output of the oscillator is also tapped by line 40 to drive, through amplifiers 41 and 42, the common-emitter push-pull amplifier consisting of transistors 43 and 44. Only when the voltage of line 40 is "high" will the amplifiers 41 and 42 drive transistor 44 to conduction to produce a pulse on line 17. The time constant fixed by condenser 45 and resistances 46 and 48 determines the delay of the start of the pulse on line 17 after the start of the pulse on line 12. The time constant of condensers 49 and 50 determines the width of the pulse on line 17. Hence, the pulse on line 17 is locked in step with the pulse on line 12 and the relative durations of the two pulses are easily controlled. Further, and importantly, the occurrence of pulses on line 17 is established intermediate the ends of the pulse on line 12.

The two voltage values of terminal X during switching are applied through coupling condenser 60a to the impedance matching circuit 19. The input impedance of the matching circuit may be made very high by coupling terminal X into the bootstrap type circuit shown. Transistors 60, 61 and 62 are cascaded as shown, transistor 62 having the emitter follower resistance 63, which is tapped to its emitter end, to feed regenerative energy back to the input of transistor 60. The amount of feedback is conveniently adjusted by potentiometer 64 so that the system will not oscillate and yet will present an apparent infinite impedance to the input circuit. The impedance of the output circuit across emitter resistor 63 is relatively low and is adapted to drive the conventional amplifier transistor 65. The single-line output of amplifier 65 is applied to the differential amplifier 20 of FIG. 2B. Similar transistors 66 and 67 have the common emitter follower resistor 68 so that the two transistors 66 and 67 are differentially biased. Transistors 66 and 67 are not bistable but, in the quiescent state, are equally conductive. As the current increases even a small amount through transistor 66, in response to a small positive-going pulse from the switch, the current correspondingly decreases through transistor 67, so that the voltage of the collector ends of load resistors 69 and 69a change in opposite directions. In response to a negative-going pulse from the switch, current through transistor 66 decreases and current through transistor 67 increases. The two collector voltages are applied respectively to the bases of the high gain common emitter differential transistor amplifiers 70 and 71. Although two push-pull stages only have been shown, it may be found under certain circumstances desirable to increase the number of stages. It is preferred that the total gain of the differential amplifier 20 be of the order of 5,000. The output circuit of amplifier 70 is clamped to ground by diodes 72 and 73 and the output circuit of amplifier 71 is clamped to ground by diodes 74 and 75. The diode pairs are oppositely polarized so that the output signals can change only limited controlled amounts above or below reference ground.

Figure 4:
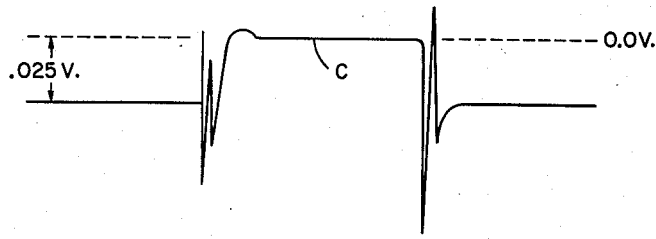
FIG. 4 shows the waveforms resulting from the specific values shown on the circuit of FIG. 3.

The utility of the gate circuit 25 will become apparent by referring to the waveforms appearing at terminal X of the switch circuit. See FIG. 4. When a switch suddenly opens or closes to switch a finite voltage, regardless of amplitude, transients inevitably occur. Since the transient voltages might well exceed the voltages to be measured, it is important that only steady state voltages be relayed to the indicating circuits at the output terminals 23 or 24. Although the transients may be suppressed somewhat by the differential amplifier 20, the transients at the beginning and end of the switch pulse, as shown in FIG. 4, are effectively eliminated by the gate 25. The gate is opened to pass only the intermediate portions of the switch pulse. This is accomplished by the synchronous relatively short pulses on line 17 generated by pulse generator 11.

A signal on line 21 at the input of the gate 25 appears at the output terminal 23 of the gate through transistor 81 only when the emitter of transistor 81 is grounded through transistor 82. Likewise, a signal on input line 22 to the gate appears at the output terminal 24 of the gate only when the emitter of transistor 84 is grounded through transistor 85. Transistors 82 and 85 are simultaneously turned "on" to simultaneously enable transistor amplifiers 81 and 84, respectively, by pulses appearing on line 17 from the timing pulse generator 11. With P-N-P type transistors, coincidence of two negative voltages are required to produce an output signal at terminal 23 or 24.

Figure 3:
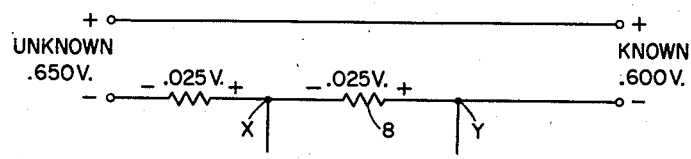
FIG. 3 shows, with specific voltage values, the voltage adder circuit of the type employed in the system of FIG. 1.

Let is be assumed in the example of voltages of FIG. 3 that the unknown voltage is .050 volt higher than the known voltage. This means that the voltage across adding resistor 8 is .025 volt and that terminal X is negative with respect to terminal Y, when the sources are polarized as shown. When the switch 10 closes, terminals X and Y are connected together and the voltage of terminal X must suddenly rise to the potential of terminal Y, as shown in FIG. 4, and the terminal voltage at X must promptly return to —.025 volt when the switch opens. As may be expected, each switch operation results in relatively violent, though damped, transient voltage disturbances. It is preferred that terminal Y be referred to ground so that closure of the switch 10 causes the voltage pulse of terminal X to always be positive-going and negative-going in response to unknown voltages, respectively, greater than and less than the known voltage.

Let it be assumed now that the unknown voltage is less than the known voltage by .050 volt so that the potential difference across adding resistor 8 is .02 volt, but now the polarity of terminal X with respect to terminal Y being reversed, as shown in FIG. 5. As shown in FIG. 6, the voltage of terminal X changes in a negative direction to zero when the switch closes. As before, transients accompany the closing and opening of the switch.

FIG. 7 shows a family of waveforms at important points of the system of this invention when the known voltage is less than the unknown voltage. FIG. 8 shows the same family of waveforms when the known voltage is greater than the unknown voltage. In FIG. 7 the duration of the pulse C is measured by the timing pulse on line 12. At the output of the differential amplifier 20, rectangular voltage pulse F appears on line 21 and rectangular voltage pulse G appears on line 22. The gating pulse H received at the gate on line 17 is negative-going and is coincident in time with the like polarized pulse F received on line 21. The result is a positive pulse on gate output line 23. The output line 24 of the gate remains undisturbed. Hence, a series of pulses appear on line 23 as long as the known voltage is less than the unknown voltage.

When the known voltage is greater than the unknown voltage, the polarity of the complementary rectangular pulses on amplifier output lines 21 and 22 are reversed with respect to the voltage conditions when the known voltage is less than the unknown voltage, as in FIG. 7. Now, timing pulse H is coincident in time with the negative pulse on line 22 and an output pulse appears on line 24 of the gate. It now appears that a series of relatively powerful pulses will appear on either output lines 23 or 24 of the gate, depending on whether the known voltage is less than or greater than the unknown voltage. More important, the transfer of the series of powerful pulses from one output line of the gate to the other occurs at the instant the unknown and known voltages are equal. The output circuits of the gate may operate relays or indicating circuits to show equality of the known and unknown voltages.

The voltage measuring circuit of this invention is reliable in operation, is not affected by amplifier input impedances, nor by amplifier gain, nor noise, nor by temperature changes, and is easy to calibrate. Many modifications may be made in the circuits of this invention without departing from the scope of the appended claims.

What is claimed is:

1. A voltage measuring system comprising a source of known voltage, a resistor, said source and resistor being connected in series across the voltage source to be measured so that the voltage across said resistor is a function of the difference of the two sources and the polarity of the voltage across said resistor changes when the relative amplitude of one voltage reverses with respect to the other, a switch means having two stable states of, respectively, substantially infinite and zero impedance, said switch being connected directly between the terminals of said resistor to produce when operated a positive-going pulse or a negative-going pulse across said terminals depending upon the direction of change of amplitude of one voltage with respect to the other, and a differential amplifier coupled to said terminals responsive to said positive-going and negative-going pulses for producing either of two distinct output voltages.

2. A system for comparing an unknown voltage with a known voltage, a resistor, means for applying voltages of like polarity of the known and unknown voltage sources to opposite ends of the resistor so that the polarity of the voltage across the resistor depends on the relative amplitudes of the known and unknown voltages, a generator, a switch means connected across said resistor and responsive to said generator for repetitively connecting the ends of said resistor together to produce a series of either positive-going or negative-going pulses depending on said polarity, a differential amplifier with a control circuit coupled across said resistor, said differential amplifier having two output circuits and means for relaying to one of said output circuits either of said positive-going or negative-going pulses, the other output circuit containing the complement of the pulses of said one output circuit, and means for utilizing the pulse signals in said output circuits to indicate equality of said known and unknown voltages.

3. A voltage measuring system comprising a source of known voltage, a source of unknown voltage, a resistance adder comprising a resistance connected between terminals of like polarity of said sources, switch means connected across said resistance so that the voltage at one end of said resistance changes in a positive or negative direction depending on the relative amplitudes of said voltages when the switch closes, a generator for generating relatively wide pulses for operating said switch, a source of relatively narrow pulses synchronized and in phase with said wide pulses, and an AND gate with one control circuit coupled to said one end of said resistance and with a second control circuit coupled to said source of relatively narrow pulses for admitting to the output of said AND gate a series of positive-going or negative-going pulses intermediate the beginning and terminal ends of said relatively wide pulse.

4. A voltage measuring system comprising a source of known voltage, a source of unknown voltage, a resistance adder coupled to terminals of like polarity of said sources for producing a voltage representative of the difference of said known and unknown voltages, a switch circuit coupled to said adder and responsive to repetitive control pulses for producing positive-going or negative-going pulses depending upon the relative amplitudes of said known and unknown voltages; a pulse generator with two outputs, one output containing a series of relatively wide pulses and the second output containing a series of relatively narrow pulses, the relatively narrow pulses occurring intermediate the ends of said wide pulses, means for applying said wide pulses to said switch circuit, a gate, said gate having two control circuits responsive, respectively, to the output of said switch circuit and to the relatively narrow pulse output of said generator for admitting to the gate output voltage pulses intermediate the ends of the wide pulse output of said switch.

5. A system for comparing a first and a second voltage comprising a first voltage source, a second voltage source, an adder resistor coupled between terminals of said sources of like polarity, a switch circuit, said switch circuit comprising a four-sided bridge, each side of said bridge containing a diode, each diode having, respectively, a very high and a very low resistance in response, respectively, to selected biasing voltages across the diode, a biasing voltage source, one diagonal of said bridge being connected across said adder resistor, the other diagonal of said bridge being connected across said biasing voltage source, the diodes of said bridge all being similarly polarized with respect to said other diagonal so that said bias source selectively makes the resistance of said one diagonal either very high or very low, and a voltage polarity indicating circuit coupled across said one diagonal of said bridge.

6. A system for comparing a first and a second voltage comprising a first voltage source, a second voltage source, an adder resistor coupled to said sources for adding the two voltages, a switch circuit, said switch circuit comprising a four-sided bridge, each side of said bridge containing a diode, each diode having, respectively, a very high and a very low resistance in response to a selected biasing voltage across the diode, a biasing voltage source, one diagonal of said bridge being connected across said resistance adder, the diodes of said bridge being similarly polarized with respect to the other diagonal so that said bias source selectively makes the resistance of said one diagonal either very high or very low, a biasing voltage source comprising a phase-splitting amplifier with two output electrodes, load resistors in series with each of said output electrodes and coupled across a direct current source for producing phase-opposed signals at each electrode in response to signals applied to the control electrode of said amplifier, means for applying said phase-opposed signals to opposite ends of said other diagonal of said switch bridge, and a utilization circuit coupled across said one diagonal of said bridge for providing signals related to the sense of the difference between said first and second voltages.

7. A system for comparing a first and a second voltage comprising a first voltage source, a second voltage source, an adder resistor coupled between like terminals of said sources for adding the two voltages, a switch circuit, said switch circuit comprising a four-sided bridge, each side of said bridge containing a diode, each diode having, respectively, a very high and a very low resistance in response to a selected biasing voltage across the diode, a biasing voltage source, one diagonal of said bridge being connected across said resistance adder, the other diagonal of said bridge being connected to said biasing source, the diodes of said bridge being similarly polarized with respect to said other diagonal so that said bias source selectively makes the resistance of said one diagonal either very high or very low to produce either positive-going or negative-going signals depending on the relative values of said first and second voltages, and a differential amplifier with a control circuit, means coupling said differential amplifier control circuit across said one diagonal of said bridge, and said differential amplifier having two output circuits for providing signals corresponding, respectively, with said positive-going and negative-going signals.

8. A system for comparing a first and a second voltage comprising a first voltage source, a second voltage source, an adder resistor coupled to like terminals of said sources for adding the two voltages, a relay having a controlled and a controlling circuit, the controlled circuit having, respectively, a very high and a very low resistance in response to a selected biasing voltage applied to said controlling circuit, a biasing voltage source, said controlled circuit being connected across said resistatnce adder and said controlling circuit being connected to said biasing source, said biasing source comprising a generator of relatively wide timing pulses, a differential amplifier with a control circuit, means coupling said differential amplifier across said adder resistor and with the two output circuits for providing, respectively, positive-going and negative-going pulses, a source of relatively narrow timing pulses synchronized with said relatively wide timing pulses, an AND gate, said AND gate including two amplifiers, one amplifier being responsive to signals from one output of said differential amplifier and to said narrow timing pulses, and the second amplifier of said gate being responsive to the second output of said differential amplifier and to said narrow timing pulses whereby said AND gate passes only steady voltage portions of the wide pulses.

References Cited in the file of this patent

UNITED STATES PATENTS

| | | |
|---|---|---|
| 2,590,528 | Gilbert | Mar. 25, 1952 |
| 2,620,400 | Snijders | Dec. 2, 1952 |
| 2,700,501 | Wang | Jan. 25, 1955 |